(12) United States Patent
Ngo

(10) Patent No.: US 6,572,272 B2
(45) Date of Patent: Jun. 3, 2003

(54) ANGLED OPTICAL CONNECTOR MOUNTING ASSEMBLY

(75) Inventor: Hung Viet Ngo, Harrisburg, PA (US)

(73) Assignee: Berg Technology, Inc., Reno, NV (US)

( * ) Notice: Subject to any disclaimer, the term of this patent is extended or adjusted under 35 U.S.C. 154(b) by 0 days.

(21) Appl. No.: 09/726,242

(22) Filed: Nov. 29, 2000

(65) Prior Publication Data

US 2002/0064348 A1 May 30, 2002

(51) Int. Cl.$^7$ ................................................. G02B 6/38
(52) U.S. Cl. ........................... 385/53; 385/60; 385/58; 385/56; 385/55
(58) Field of Search ........................... 385/60, 58, 56, 385/55, 53, 88, 89, 134, 135

(56) References Cited

U.S. PATENT DOCUMENTS

| | | | |
|---|---|---|---|
| 2,460,636 A | | 2/1949 | Holloway |
| 3,387,253 A | | 6/1968 | Salners |
| 4,119,359 A | | 10/1978 | Schultz ........................ 339/128 |
| 4,840,451 A | * | 6/1989 | Sampson et al. ............. 385/89 |
| 5,082,344 A | * | 1/1992 | Mulholland et al. .......... 385/60 |
| 5,142,597 A | * | 8/1992 | Mulholland et al. .......... 385/55 |
| 5,302,140 A | | 4/1994 | Arnett ........................ 439/544 |
| 5,724,467 A | * | 3/1998 | vandenEnden et al. ..... 385/134 |
| 5,757,997 A | | 5/1998 | Birrell ........................ 385/60 |
| 5,960,136 A | * | 9/1999 | Shakhman et al. ........... 385/53 |
| 6,160,946 A | * | 12/2000 | Thompson et al. ......... 385/134 |
| 6,167,183 A | * | 12/2000 | Swain ........................ 385/134 |
| 6,193,420 B1 | * | 2/2001 | Sikorski, Jr. ................. 174/67 |
| 6,231,380 B1 | * | 5/2001 | Cabalka et al. .......... 439/540.1 |
| 6,305,961 B1 | * | 10/2001 | Szilagyi et al. ............. 439/271 |
| 6,328,601 B1 | * | 12/2001 | Yip et al. .................... 439/608 |
| 6,335,996 B1 | * | 1/2002 | Yamaguchi ................. 385/134 |
| 6,349,164 B1 | * | 2/2002 | Mair et al. ................... 385/134 |
| 6,431,764 B1 | * | 8/2002 | Scharf et al. ................. 385/88 |
| 2002/0028055 A1 | * | 3/2002 | Shibutani et al. ........... 385/134 |
| 2002/0172469 A1 | * | 11/2002 | Benner et al. ................ 385/55 |

FOREIGN PATENT DOCUMENTS

| | | |
|---|---|---|
| EP | 0887893 A3 | 11/1999 |
| WO | WO 99/36997 | 7/1999 |

* cited by examiner

Primary Examiner—John D. Lee
Assistant Examiner—Daniel Valencia
(74) Attorney, Agent, or Firm—Harrington & Smith, LLP

(57) ABSTRACT

A mount for connecting an optical connector adapter to a panel. The mount comprises a first section adapted to attach to the panel; and a second section having an aperture for receiving a portion of the optical connector adapter. The second section is adapted to extend through a hole in the panel. The aperture has a centerline axis which is angled relative to the first section such that the centerline axis of the aperture is angled relative to a centerline axis of the hole when the first section is attached to the panel.

8 Claims, 4 Drawing Sheets

ANGLED OPTICAL CONNECTOR MOUNTING ASSEMBLY

BACKGROUND OF THE INVENTION

1. Field of the Invention

The present invention relates to optical connectors and, more particularly, to an assembly for connecting optical connectors to each other at an angle relative to another member.

2. Brief Description of Earlier Developments

PCT publication WO 99/36997 discloses a faceplate for connecting an electrical plug and an electrical outlet to each other at an angle relative to a plane of the faceplate. U.S. Pat. No. 5,082,344 discloses an optical connector adapter for connecting optical connectors of two optical conductor assemblies to each other. The adapter has flanges to connect the adapter to another member at a perpendicular through-hole configuration. There is a tendency to make electronic and optical apparatus smaller. However, for apparatus with an adapter and connectors similar to U.S. Pat. No. 5,082,344, there needs to be enough room at the connection site to allow a user to insert and remove the optical connectors from the adapter. This limits reduction in size of electronic and optical apparatus. There also must be enough open area in front of and behind the adapter such that the optical conductors are not kinked or broken. There is a desire to connect optical connectors to each other at an optical connector adapter (attached to another member such as a back plane or back panel) in an arrangement that will allow for a smaller open area in front of and behind the adapter for insertion and removal of the connectors. There is also a desire to allow the optical connectors to be attached to each other at a non-perpendicular angle to a plane of the back plane or back panel. The positioning of the adapter can ensure, for example, that any light transmitted by the connector after unmating is projected towards the floor, protecting the operator.

SUMMARY OF THE INVENTION

In accordance with one embodiment of the present invention, a mount is provided for connecting an optical connector adapter to a panel. The mount comprises a first section adapted to attach to the panel; and a second section having an aperture for receiving a portion of the optical connector adapter. The second section is adapted to extend through a hole in the panel. The aperture has a centerline axis which is angled relative to the first section such that the centerline axis of the aperture is angled relative to a centerline axis of the hole when the first section is attached to the panel.

In accordance with another embodiment of the present invention, a combined optical connector adapter and mount assembly is provided comprising a mount adapted to be connected to a frame and extend through a hole in the frame; and an adapter connected to the mount. The adapter is adapted to connect at least two optical connectors to each other at an acute angle relative to a center axis of the hole.

In accordance with another embodiment of the present invention, an optical connector adapter assembly is provided for connecting at least two optical conductor connectors to each other at a hole through a planar section of the frame. The improvement comprises a housing of the assembly comprising a receiving section for receiving the connectors which, when the assembly is connected to the frame and the connectors are located in the receiving section, angles the connectors at acute angles relative to a plane of the planar section of the frame.

In accordance with one method of the present invention, a method of connecting an optical connector adapter to a frame is provided comprising steps of connecting the optical connector adapter to a mount; and connecting the mount to the frame with the adapter extending through a hole in the frame. The adapter provides a connection of optical connectors to each other along an axis which is angled relative to a centerline axis of the hole.

In accordance with another method of the present invention, a method of connecting an optical connector adapter assembly to a frame is provided comprising steps of locating a first portion of a housing of the assembly in a hole of the frame, the first portion having a receiving area for receiving ends of optical conductors; positioning a section of the frame, which is proximate the hole, in a recess of the housing; and connecting a second portion of the housing to the frame with a single fastener, wherein the housing is stationarily connected to the frame due to a combination of contact of the housing with the frame in the hole, contact of the housing with the frame in the recess, and connection between the housing and the frame by the single fastener.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1:
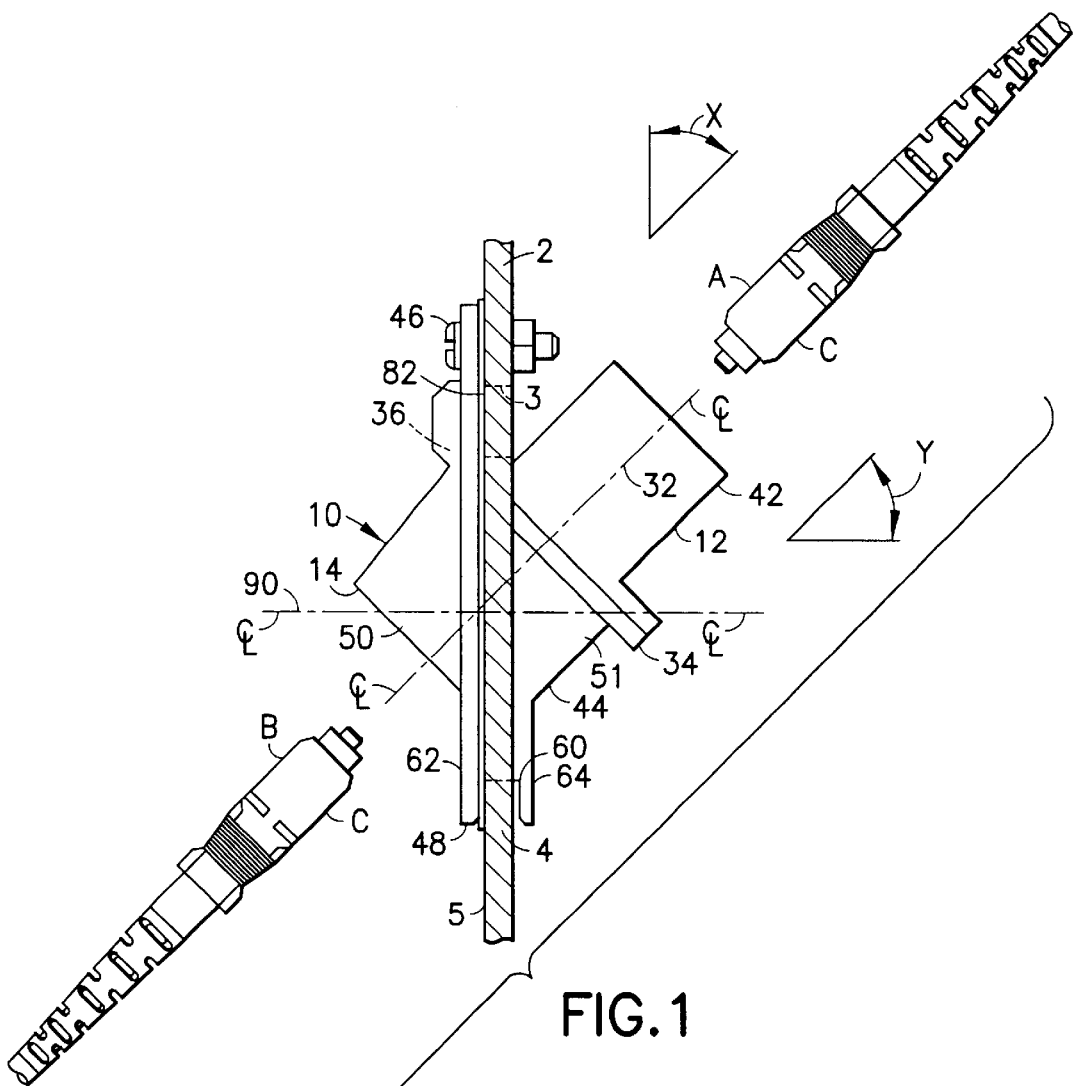
FIG. 1 is a side view of an optical connector assembly incorporating features of the present invention attached to a panel (shown in cross-section) and two optical conductor assemblies A, B intended to be connected to each other inside the assembly.

Referring to FIG. 1, there is shown a side view of an optical connector assembly 10 incorporating features of the present invention attached to a member 2 (shown in cross-section) and two optical conductor assemblies A, B intended to be connected to each other inside the assembly 10. Although the present invention will be described with reference to the single embodiment shown in the drawings, it should be understood that the present invention can be embodied in many alternate forms of embodiments. In addition, any suitable size, shape or type of elements or materials could be used.

Figure 2:
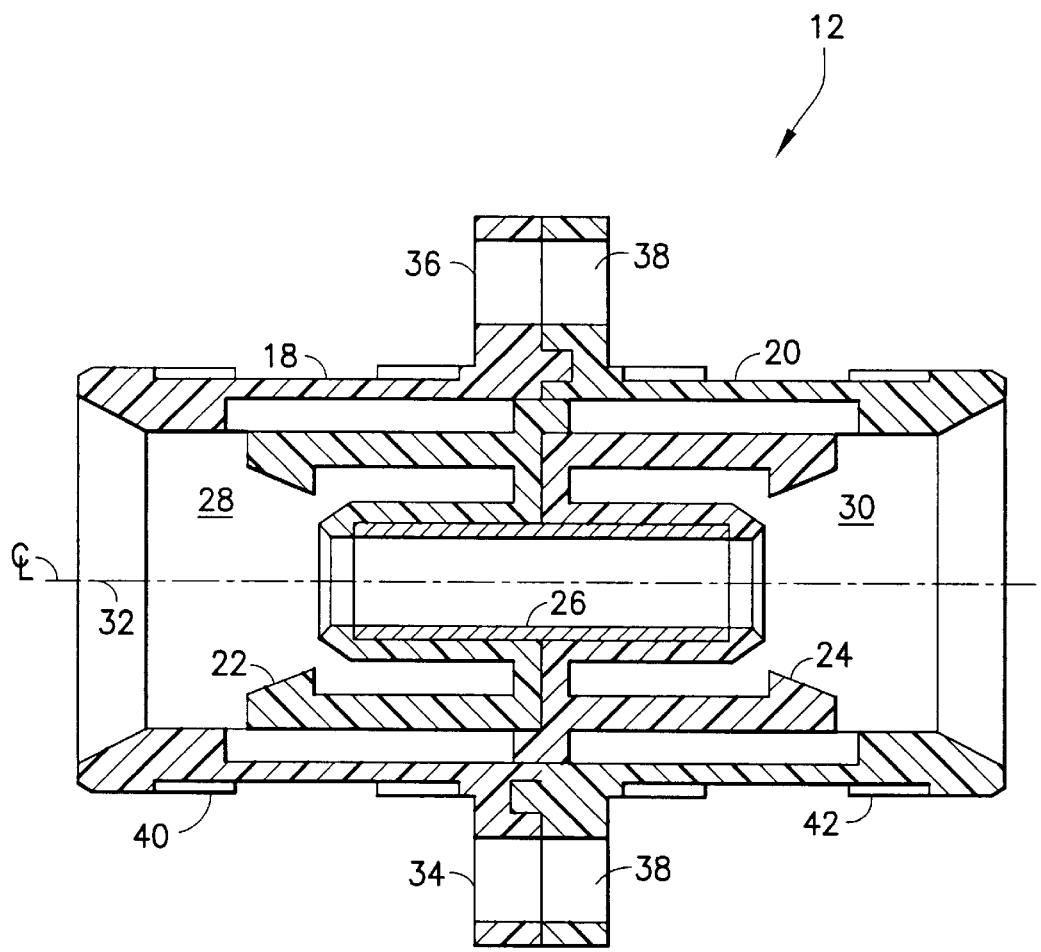
FIG. 2 is a cross-sectional view of the optical connector adapter used in the optical connector assembly shown in FIG. 1.

The assembly 10 generally comprises an optical connector adapter 12 and a mount 14. Referring also to FIG. 2 the adapter 12 generally comprises a housing 16 comprised of two outer housing pieces 18, 20, two inner housing pieces 22, 24, and a sleeve 26. However, in alternate embodiments any suitable type of adapter could be used. For example, the adapter could be a SC-SC Duplex Adapter sold under part number 74811 by FCI USA, Inc. or a LC Low Profile Adapter sold under part number 74884 by FCI USA, Inc. In the embodiment shown, the adapter 12 is a SC/SC Adapter With Flanges sold under part 74885 by FCI USA, Inc. The adapter 12 has two receiving areas 28, 30 for receiving the connectors C along a centerline axis 32 to mate the connectors C to each other. The pieces 18, 20, 22, 24 are preferably comprised of plastic and are ultrasonically wedged to each other. The inner pieces 22, 24 form deflectable snap-locks for the connectors C of the optical conductor assemblies A, B. The outer pieces 18, 20 form mounting flanges 34, 36 with fastener holes 38. The adapter 12 can be attached to another member without the mount 14, such as a printed circuit board or back panel, with one of the ends 40 or 42 extending through a hole in the member; generally perpendicular to a plane of the hole and the member. Thus, as is known in the art, the adapter 12 can be attached to another member as a perpendicular type of adapter, with the centerline axis 32 parallel or coaxial with the centerline axis of the hole which the adapter is located in. However, as noted above, in alternate embodiments any suitable type of adapter could be used.

Figure 3:
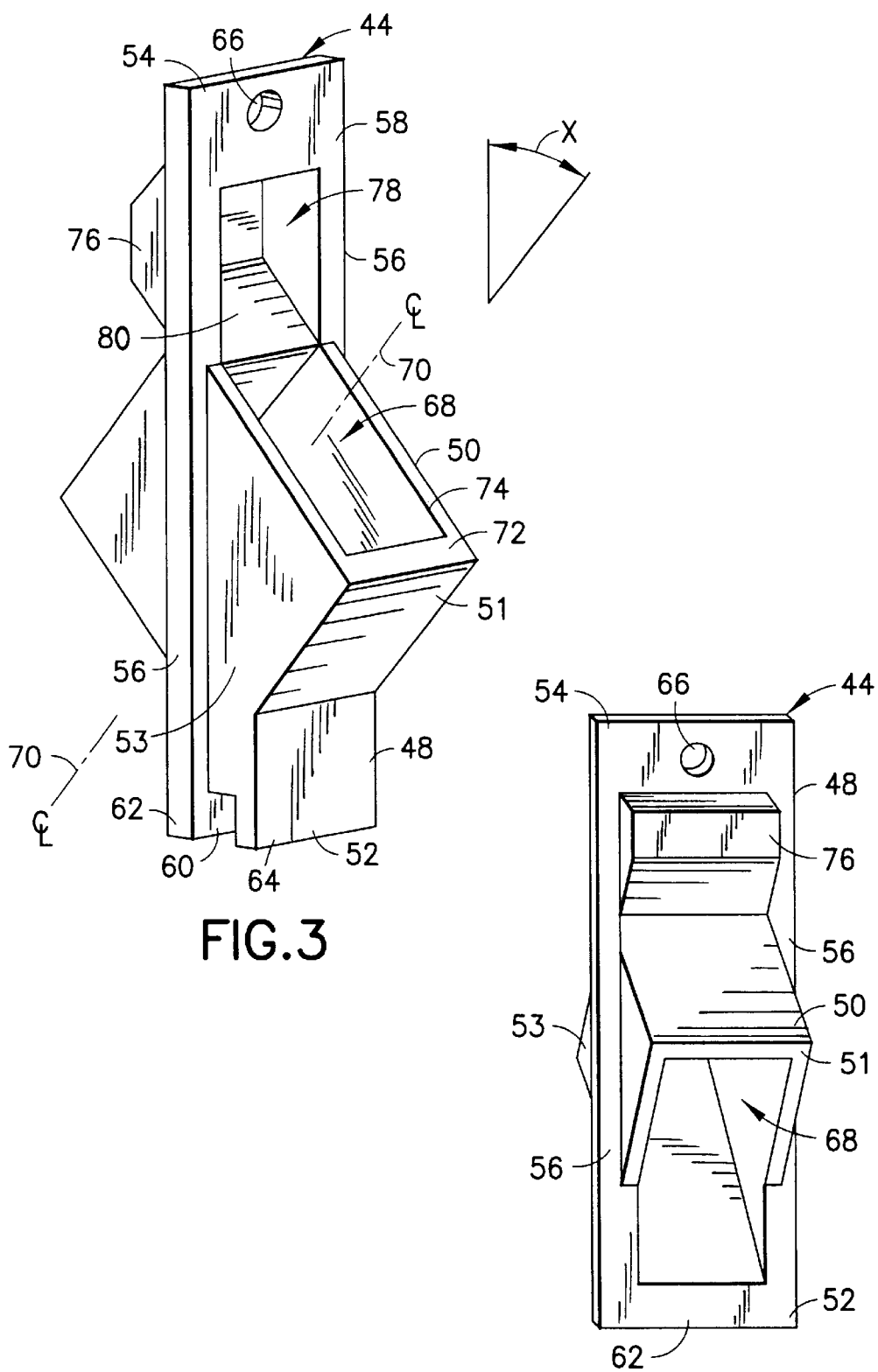
FIG. 3 is a perspective view of the mount used in the optical connector assembly shown in FIG. 1.
Figure 4:
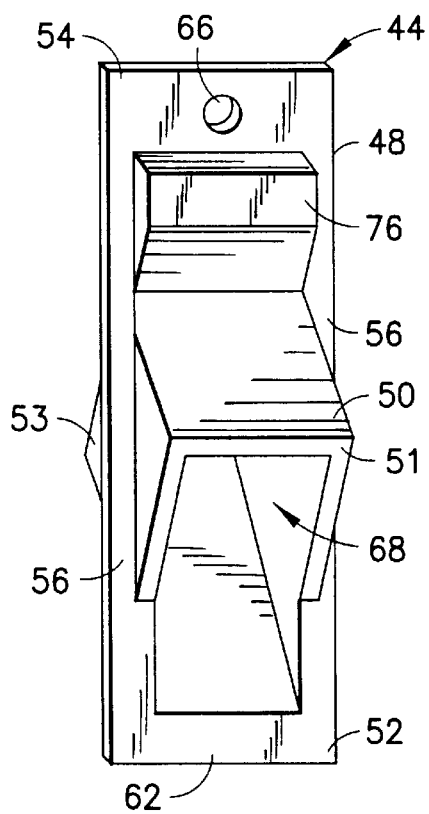
FIG. 4 is a perspective view of an opposite side of the mount shown in FIG. 3.

The mount 14 of the present invention is provided to allow the perpendicular type of adapter 12 to be connected to another member in a non-perpendicular or angled type of connection. Referring also to FIGS. 3 and 4, mount 14 comprises a conductive (e.g.: metal) one-piece member or housing 44 and a single fastener 46 (see FIG. 1). In an alternate embodiment the housing 44 could be comprised of multiple members, could be comprised of any suitable material(s), and could have any suitable shape. The mount could also have more than one fastener. The fastener 46 in this embodiment generally comprises a nut and bolt, but any suitable type of fastening system could be provided including a fastener or fastening system integrally formed with the housing 44.

The housing 44 generally comprises a first mounting section 48 and a second adapter connection section 50. The first section 48 generally comprises a bottom end 52, a top end 54 and side flanges 56. The first section 48 forms a generally planar surface 58 on one side of the flanges 56, top end 54 and a part of the bottom end 52. The bottom end 52 includes a recess or slot 60 between a portion 62 having a part of the surface 58 and a portion 64. The top end 54 includes a hole 66 for the fastener 46. However, in alternate embodiments the first section 48 could have any suitable shape which is adapted to attach the mount to the frame 2. For example, rather than the bottom end 52 having an interlocking slot 60, the bottom end 52 could have a hole similar to hole 66 and another fastener could be used to attach the bottom end to the frame 2. Alternatively, any suitable connection of the mount 14 to the frame 2 could be provided. The mount 14 could also be shaped such that it does not extend through the hole 3 in the frame 2.

The second adapter connection section 50 generally comprises a box or tube shaped section 51 located between the two ends 52, 54. However, the second section 50 could have any suitable shape adapted to connect the adapter 12 to the mount. In this embodiment the tube shaped section 51 has a through-hole or aperture 68 with a centerline axis 70 which is angled relative to the mounting section 48 and the plane of the surface 58. In a preferred embodiment the angle X is about 45°. However, any acute angle could be provided. The tube shaped section 51 includes a ledge 72 at an entrance 74 into the aperture 68. The dimensions of the aperture 68 are about the same as the outer dimensions of the end 40 of the adapter 12. Thus, the end 40 can be slid into the aperture 68 through the entrance 74. The second section 50 also includes a pocket section 76. The pocket section 76 has a recess or pocket 78. A bottom of the pocket 78 forms a ledge 80 at an opposite end of the entrance 74 from the ledge 72. The pocket 78 provides an open area to accommodate the flange 36 of the adapter 12. The flange 36 can rest against the ledge 80 and the flange 34 can rest against the ledge 72. However, in alternate embodiments the pocket section 76 might not be provided.

In a preferred embodiment the adapter 12 is fixedly attached to the housing 44. For example, the two housings 44 and 40 could be ultrasonically welded to each other, or bonded to each other, or mechanically attached to each other by a spring clip or snap-lock latch system. However, any suitable connection could be provided. In an alternate embodiment features of the adapter 12 could be integrally formed with the housing 44. Thus, features of the present invention could be comprised in a dedicated angled adapter that did not use a perpendicular type adapter to form a mount/adapter assembly. However, the present invention provides the feature of the ability to use a single type of adapter to provide either a perpendicular type of mounting arrangement for connecting connectors C to each other perpendicular to a plane of a planar section of another member, or a non-perpendicular or angled type of mounting arrangement for connecting connectors C to each other at an acute angle to the plane merely by additional use of the mount 14.

As seen in FIG. 1, the member 2 is provided with a hole 3. The member 2 has a section 4 at the bottom of the hole 3. When the mount 14 is attached to the member 2 the tube section 51 extends through the hole 3. The section 4 of the member 2 is received in the receiving area 60 at the bottom end 52. The surface 58 is located against the side 5 of the member 2 or, alternatively, a gasket 82 could be provided with the conductive housing 44. The fastener 46 extends through the hole 66 and attaches the top end 54 to the member 2. Sides 53 of the tube section 51 can contact sides of the hole 3. Thus, the mount 14 can be fixedly and stationarily attached to the member 2. With the adapter 12 connected to the mount 14, and the mount 14 connected to the member 2, the centerline 32 of the receiving areas 28, 30 is angled relative to the centerline 90 of the hole 3 at an angle Y. In a preferred embodiment the angle Y is about 45°. However, any suitable acute angle could be provided. Thus, the connectors C can be connected to each other at angle X relative to the plane of the member 2 and hole 3.

The present invention also provides the feature of increased safety to a user who removes the assembly B from the front of the panel 2. More specifically, because of the angled mount 14, if the connector C of the assembly B is removed from the adapter 12, light passing out of the assembly A at its connector C will be directed downward towards the ground or floor. Thus, there is significantly reduced risk that the light will impact the user's eyes and perhaps cause damage to the user's eyes.

Figure 5:
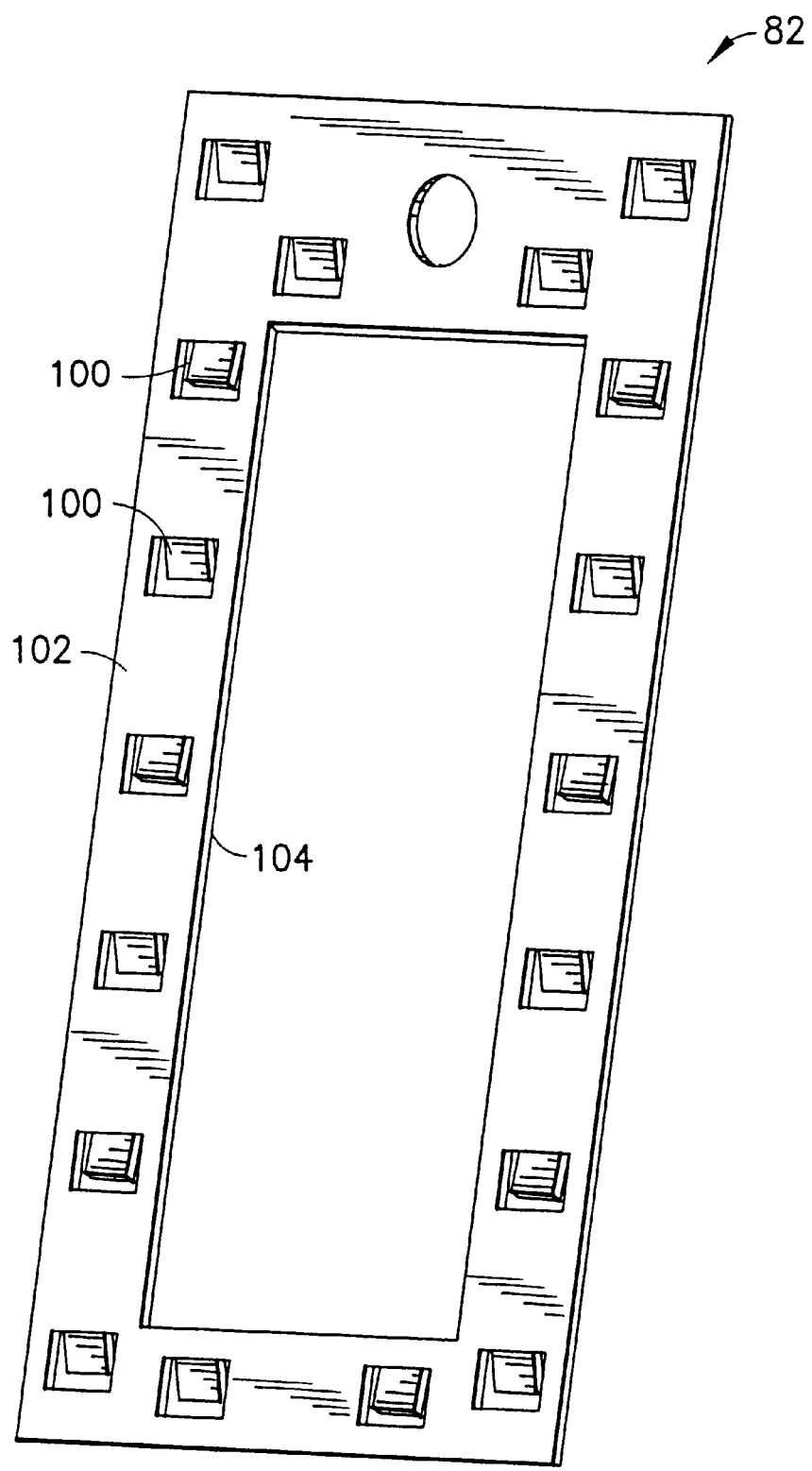
FIG. 5 is a perspective view of the gasket shown in FIG. 1.

As noted above, the housing 44 can be comprised of a conductive material, such as metal, and can function as a shield to help prevent electromagnetic interference (EMI) from passing through the hole 3. The gasket 82 can also be comprised of conductive material, such as metal, for example. The metal gasket can provide EMI shielding between the front of the panel and the adapter mount. Referring also to FIG. 5, one embodiment of the gasket 82 is shown. In this embodiment, the gasket 82 has spring fingers 100 which extend from opposite sides 102, 104. Each spring finger provides ground contact and also assures firm mating between the adapter mount 14 and the panel 2. In this embodiment the gasket 82 is comprised of a stamped sheet metal member. However, in alternate embodiments any suitable gasket could be provided, the gasket could have any suitable shape, the gasket could be provided with any suitable material(s), and any suitable method could be used to form the gasket. As noted above, the mount 14 could be used without a gasket.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. An angled optical connector mounting assembly comprising:
   a metal mount adapted to be connected to a frame and extend through a hole in the frame, wherein the mount includes a section having a receiving area including an open portion, said receiving area having a longitudinal axis at an acute angle relative to said hole when the metal mount is connected to the frame, wherein the section is adapted to extend through the hole in the frame when the mount is connected to the frame;
   a separate adapter positioned in said open portion of said receiving area of said mount, wherein the adapter is adapted to connect at least two optical connectors to each other at an acute angle relative to a center axis of the hole, wherein the adapter is adapted to respectively, directly connect the optical connectors thereto; and
   a separate shield gasket removably positioned between the metal mount and the frame and making an electrical connection with the metal mount, the shield gasket having spring fingers in contact with the metal mount, and wherein the shield gasket and metal mount provide a combined shield at the hole in the frame.

2. An assembly as in claim 1 wherein the acute angle is about 45°.

3. An assembly as in claim 1 wherein the receiving area comprises a general rectangular cross-section.

4. An assembly as in claim 1 wherein a first end of the mount is adapted to directly interlock with a portion of the frame.

5. An assembly as in claim 4 wherein the first end of the mount comprises a recess for receiving the portion of the frame therein.

6. An assembly as in claim 4 wherein a second opposite end of the mount comprises a hole for a fastener.

7. An assembly as in claim 1 wherein the adapter comprises a housing with flanges on opposite sides of the housing which are located against ledges of a housing of the mount on opposite sides of an aperture through the mount.

8. An assembly as in claim 7 wherein the mount comprises a pocket for receiving one of the flanges.

\* \* \* \* \*